Dec. 20, 1955  G. WHITE  2,727,484
AMPHIBIOUS HOUSE TRAILER
Filed Feb. 16, 1951  4 Sheets—Sheet 1

Inventor
Gerald White
By Nobbe & Swope
Attorneys

Dec. 20, 1955   G. WHITE   2,727,484
AMPHIBIOUS HOUSE TRAILER
Filed Feb. 16, 1951   4 Sheets-Sheet 2
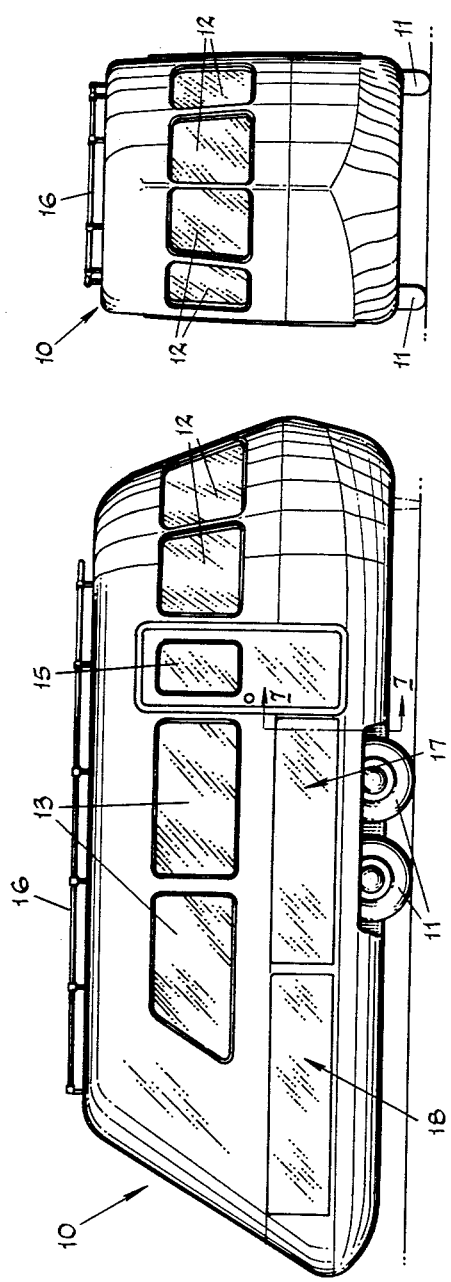
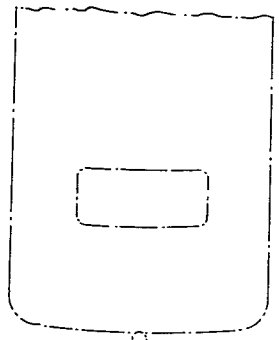
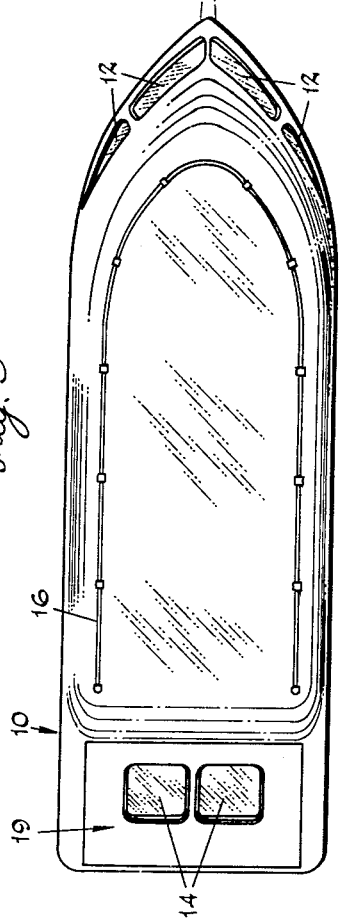
Inventor
Gerald White
Nobbe & Swope
Attorneys Dec. 20, 1955
G. WHITE
2,727,484
AMPHIBIOUS HOUSE TRAILER
Filed Feb. 16, 1951
4 Sheets-Sheet 3
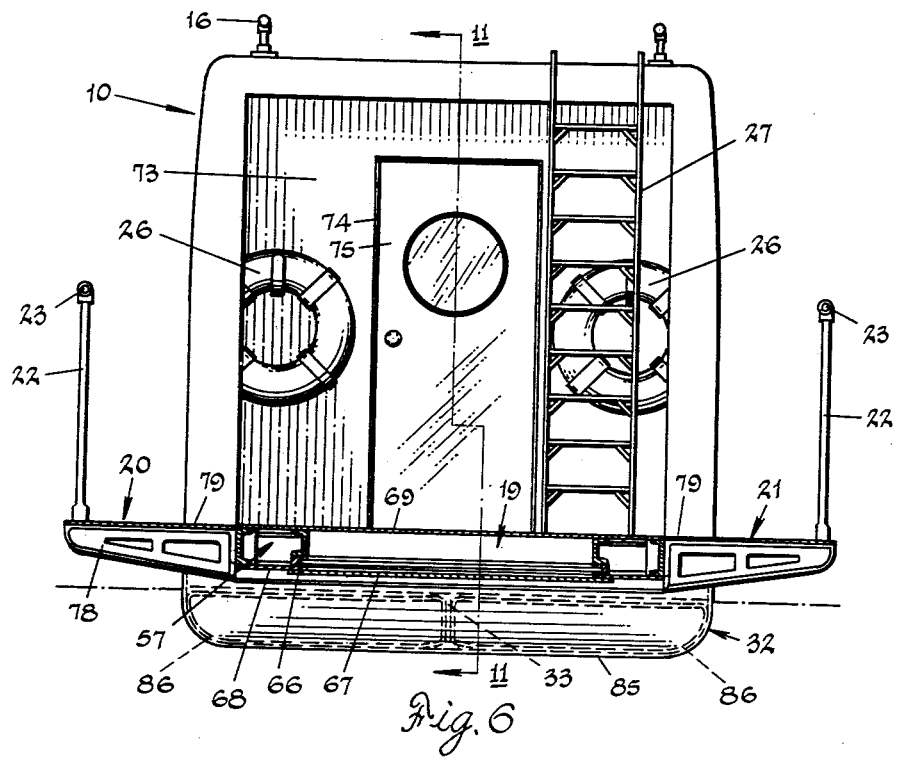
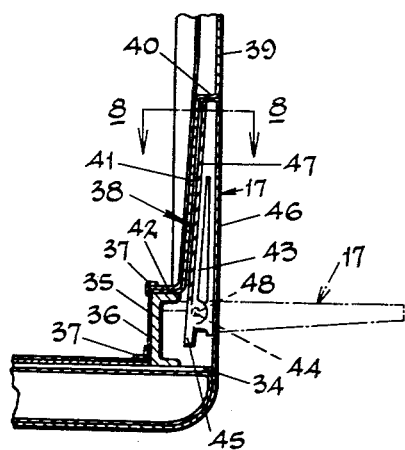
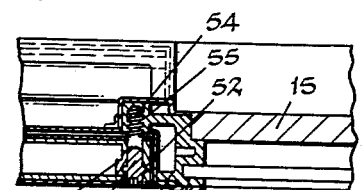
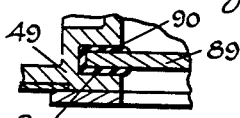
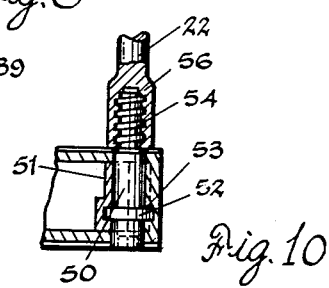
Inventor
Gerald White
Nobbe & Swope
Attorneys Dec. 20, 1955

G. WHITE 2,727,484

AMPHIBIOUS HOUSE TRAILER

Filed Feb. 16, 1951

Inventor
Gerald White
Nobbe & Swope
Attorneys

United States Patent Office 2,727,484
Patented Dec. 20, 1955

2,727,484

AMPHIBIOUS HOUSE TRAILER

Gerald White, Rossford, Ohio

Application February 16, 1951, Serial No. 211,320

2 Claims. (Cl. 114—.5)

The present invention relates broadly to house trailers. More particularly it has to do with an amphibious house trailer which can be readily converted from a conventional, streamlined trailer to an unusual type of houseboat or motor driven yacht of trim lines and pleasingly nautical appearance.

It is well known that, within recent years the house trailer has come to be an American institution, by means of which trailer owners are provided with a comfortable and, in many cases, almost unbelievably luxurious, home on wheels, which permits them to travel to any place, accessible to an automobile, with no housing problems either en route or after their arrival at any chosen vacation or scenic spot of the nation.

It is the purpose of the present invention to extend the possibilities, the potential enjoyment, and the effective cruising range of the trailer owner far beyond anything heretofore believed to be possible.

Briefly stated this is accomplished by the provision of a novel vehicle which is equally at home on the land or in the water; which normally provides all of the advantages, convenience and maneuverability of a conventional house trailer; but which can be quickly, easily and expeditiously transformed into a seaworthy and unusual watercraft that will compare favorably with the finest luxury type yachts of a similar size.

As a consequence, by means of the vehicle of my invention, its owner can travel to a river, lake or seaside location of his choice, and remain there as long as he wishes, with all of the comfort and luxury available to the owner of the most de luxe form of house trailer; and, in addition he can, by a relatively simple procedure, convert his trailer from a land to a water home, and so enjoy to the full the opportunities of fishing and boating presented by his waterside environment; or, he can continue or extend his journey, under his own power, over a medium not generally open to house trailers except by trans-shipment at considerable expense.

An important object of the invention is to provide a mobile land vehicle of the house trailer type which can be speedily and practicably converted to an amply decked, mobile water cruiser of unusual character.

Another object is the provision of an amphibious vehicle having portions that are movable from one position in which they normally form part of a mobile land vehicle into a second position in which they form decks of a mobile watercraft.

Another object is to provide, in a vehicle of the above general character, hingedly mounted wall panels that are swingable into position to provide a porch for the vehicle, when on land, or a deck for the craft when in the water.

Another object is the provision in such a vehicle of means for retaining the panels in one position to form a part of the wall of the land vehicle and in the other position to form decks or porches.

Another object is to provide, in a vehicle of this character, recesses that are normally closed by the above-mentioned panels and within which nautical equipment can be mounted in a manner to be exposed when the panels are moved into position to form decks.

Another object is the provision, in a vehicle of the above character, of a plurality of watertight bulkheads beneath the floor of the trailer to make it seaworthy.

Still another object is to provide a railed area on top of the vehicle which provides a luggage carrying space for the trailer and an upper or hurricane deck for the water vehicle.

Other objects and advantages of the invention will become more apparent during the course of the following description, when taken in connection with the accompanying drawings.

In the drawings, wherein like numerals are employed to designate like parts throughout the same:

Fig. 3 is a side elevation of the vehicle as shown in Fig. 1;

Fig. 4 is a front elevation of the same;

Fig. 5 is a top plan view thereof, showing in phantom lines the manner in which it is hitched to the rear end of an automobile;

Fig. 6 is a stern view partly in section of the water vehicle of Fig. 2;

Fig. 7 is a fragmentary vertical sectional view through a wall of the vehicle, taken substantially along the line 7—7 in Fig. 3, and showing the hinged panel portion;

Fig. 8 is a transverse section taken substantially along the line 8—8 of Fig. 7;

Fig. 9 is a fragmentary, horizontal section through the side door frame, showing the mounting for a watertight threshold or sealing plate;

Fig. 10 is a fragmentary, vertical section through an end of one of the hinged panels, showing the manner in which the threaded panel retaining member may be used to mount the posts of the deck rails;

Figure 1:
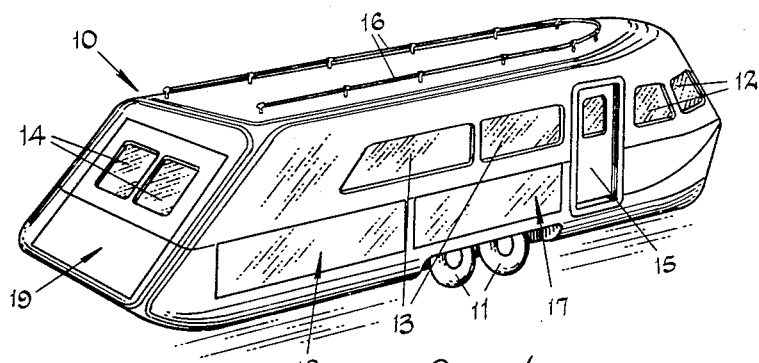
Fig. 1 is a perspective view of the amphibious house trailer of my invention as it appears on the road.

Referring now more particularly to the drawings, there is shown in Figs. 1, 3, 4 and 5 the vehicle of the invention as it appears in its normal condition and ready for use as a house trailer. It will be noted that in this state the vehicle has similar lines to that of the conventional trailer, although somewhat more streamlined, and can be made as commodious and luxurious as desired.

For this purpose the vehicle includes a body portion 10, mounted on suitable wheels 11, and is provided with front windows 12, side windows 13 and rear windows 14. A door 15 may be provided on one or both sides, preferably adjacent the front end, to provide access to the trailer; and the roof is railed off as at 16 to provide a large and convenient luggage carrying space.

Figure 2:
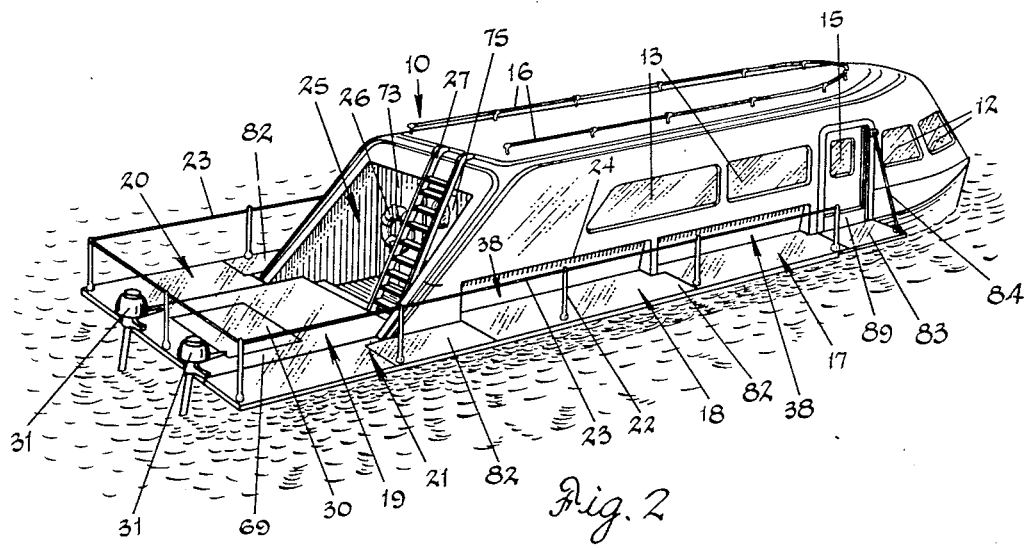
Fig. 2 is a similar view with the hinged panels swung out to form decks and showing the vehicle as it appears in the water.

However, according to the invention, this seemingly conventional house trailer can be quickly transformed into a rakish cabin cruiser by the simple expedient of first swinging the panels 17 and 18 on both sides of the trailer, and the rear wall or panel 19 at the back, downwardly into the position shown in Figs. 2 and 6. In this position the panels 17, 18, and 19 form decks of the cruiser, the rear panel 19 becoming the after deck and, by filling in the spaces in and between the lowered panels with auxiliary deck plates 20, 21, 30, 82 and 83 which may be stored in the body of the trailer, a continuous deck extending around three sides of the cruiser is provided. Posts 22 can then be mounted around the margins of the deck, in a manner to be more clearly hereinafter described, and ropes 23 can be attached to or threaded through eyes in the posts 22 to form the deck rail.

The lowering of the panels 17, 18 and 19 also discloses side recesses or compartments 24 and rear compartment 25 respectively, within which can be stored or mounted equipment such as life preservers 26 which, in addition to their utilitarian value, also add a further nautical touch to the craft.

The rear compartment 25, which provides extra storage space in the house trailer, becomes the cockpit or flying bridge of the cruiser when the panel 19 is lowered into position to become the after deck; and a ladder 27, which can normally be stored in the body of the trailer, can then be mounted in the cockpit to provide access to the railed space 28 which thus becomes the upper or hurricane deck of the craft.

The recess 29 for the windows 14 in the rear panel, or after deck, 19 can be closed by a metal plate 30 or, when tempered or strengthened glass is used in these windows, the recess may be left open, or made flush with the deck to provide a glass bottom type of deck through which the marine life beneath the craft may be observed.

Suitable motive power may be provided for the cruiser by fixing one or more outboard motors 31 to the after deck by the usual clamps employed for this purpose, and the craft is then ready to "shove off."

Figure 11:
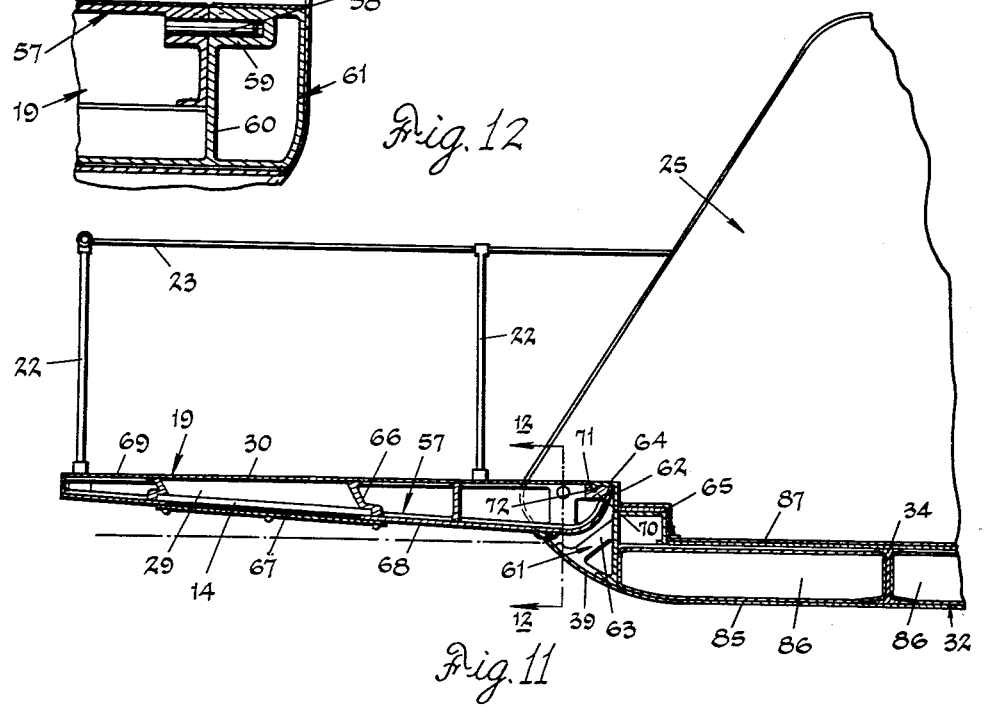
Fig. 11 is a vertical sectional view taken substantially along the line 11—11 in Fig. 6.

It will be apparent from the above that one of the features of the invention that permits this novel house trailer to be so quickly transformed into a remarkably efficient and trim cabin cruiser, is that of the panels 17, 18 and 19 which, in one position, form a position of the side walls of the trailer and, in another position, become the porch of the home on wheels, or the deck of the cruiser. To make this possible each of these panels which, as best shown in Figs. 2, 6, 7 and 12 to 14, are of hollow metal construction, may be supported on and made movable with reference to an especially constructed framework about which the body of the trailer is developed. As shown in Figs. 6 and 11, the base 32 of the framework includes suitably formed I beams 33, which are located longitudinally of the trailer body, and interrelated, transversely disposed I beams 34, arranged at regularly spaced points along the beams 33 and extending outwardly therefrom. The usual vertical side framing members for the trailer may be secured to these beams and, likewise, the flooring panels may be supported thereon. However to incorporate adequate "wells" for receiving the panels 17 and 18 into the side walls of the trailer body, suitable channel members, such as is illustrated at 35 in Fig. 7 are secured to the transverse beams 34 in the nominal longitudinal floor corners.

These beams 35 are covered with suitable paneling 36 and trim strips 37 to carry out the desired "finish" of the interior of the trailer while concealing the creation of the "well" area 38 for receiving the movable panel 17 or 18. Preferably the exterior paneling or "skin" 39 of the trailer is formed of suitably formed sheets which may be secured together along their margins as by welding or like methods to present an unbroken surface as shown in Figs. 3 and 4. The paneling is thus shaped inwardly as at 40 (Fig. 7) and downwardly, as at 41, and again inwardly as at 42 to present an attaching flange that is securable on the upper surface of the adjacent beam 35 and concealed by the interior paneling 36. By adequately insulating the thus created joints in a waterproof manner, the "wells" 38 will be sealed off from the living quarters of the trailer and dust or water will be prevented from seeping inwardly. This positive seal is of utmost importance when the trailer is converted for nautical excursions.

The panels 17 and 18 are compactly receivable within the wells 38 so that when positioned as shown in full line in Fig. 7 they will blend with the outer wall or skin 39 of the trailer and present a surface which may be painted in contrasting color, the departure from one color to another occurring at the "break line" created by the inward bend 40 of the skin 39. The panels are composed of an internal cast or fabricated framing 43 which includes bearing portions 44 and tongues 45. The framing 43 has paneling 46 secured outwardly thereof, which paneling is of the same finish as the skin 39 of the trailer. This paneling 46 forms the under surface of the panel 17 or 18 when the same is disposed to form a portion of the deck as indicated in phantom line in Fig. 7; while a second paneling 47 forms the floor. The floor is preferably considerably more rigid and may be ridged or otherwise suitably surfaced to prevent slippage when walked upon.

The panels are pivotally carried within the wells 38 by shafts 48 journaled in bearings 44 and fixedly mounted at their oppositely disposed ends in a special riser member 49 secured to or formed as an integral vertically extended element of the channels 35. As also shown in Fig. 8, the panels have arranged in the corners thereof, rotatable, threaded locking members 50 by means of which, said panels are secured in their upper, closed positions as shown in Figs. 3 and 7. These threaded members 50 are journaled in bearings 51 located in the corners of the framing 43 and concealed by the panels 46 and 47. To prevent endwise movement of the locking members, collars 52 are formed thereon, said collars being seated in grooves 53 formed in the bearings 51.

The threaded ends 54 of the members 50 are received in internally threaded portions 55 of the riser member 49 and are movable with reference to the threaded portions 55 by means of a conventional square nose wrench. When located as shown in Fig. 8, the locking members 50 will secure the panels 17 and 18 in their closed position to complete the semblance of the streamlined trailer to those of conventional construction. When the panels 17 and 18 are subsequently removed from the wells 38 and lowered into position to serve as the side portions of the deck, the threaded ends 54 are adapted to receive the internally threaded ends 56 of the deck posts 22 as shown in Fig. 10.

Figure 12:
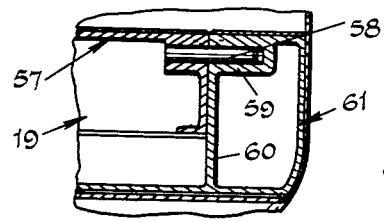
Fig. 12 is a fragmentary sectional view taken substantially along the line 12—12 in Fig. 11.

The panel 19, which when lowered provides the after or stern deck of the converted trailer, is of a similar construction, including an internal frame structure 57 that is generally wedge-shaped to present a lower sloping surface and substantially horizontal upper surface which will be positioned to serve as the deck. The frame 57 is pivotally carried by shafts 58, as shown in Fig. 12, which are journaled in bearings 59 formed in the wall 60 of a frame member 61. This frame member constitutes the rear transverse element of the base 32 of the trailer framework and, as shown in Fig. 11, comprises the walls 60, a transverse, vertical section 62, a base section 63 and a horizontally disposed flange 64 which in part serves as a step or threshold onto the deck formed by the panel 19. The frame 57 of the panel 19 is thus located between the walls 60 of the frame member 61 and is radially movable with reference to said walls about the axes of the shafts 58.

The base section 63 of the frame member 61 is suitably curved, as shown in Fig. 11, to reenforce the exterior paneling 39 of the trailer and provide a curved surface over which said paneling may be shaped and adequately secured to render the continuity of streamlining possible. The member 61 may also be provided with an inwardly disposed angle 65 that is adapted to serve as a step or tread and over which the flooring material may be placed.

The frame 57 is centrally so formed as to accommodate the sash details 66 for the rear windows 14 and provision may be made as by the plate 30 and a metal plate 67 to protect the said window either from the wash of the water or damage by floating objects, or provide an unbroken deck surface. This frame 57 is enclosing by paneling on both sides in similar manner to the frames 43 of the panels 17 and 18, that is to say, the exposed or outer surface of the frame is sheathed by paneling to complete the outer "skin" of the trailer as by the paneling 68 while the opposite or upper surface is covered by suitable deck floor panels 69 for usual walking purposes.

The panels 17, 18 and 19 have been shown here as being manually operable into open and closed position, and it will be understood that they can be suitably counterbalanced to facilitate such movement. This will be entirely satisfactory, where it is not desired to mechanically raise and lower the panels by the power plant of the vehicle or in any other conventional manner.

In any event, when the panel 19 is positioned to enclose the rear of the vehicle, it will, by reason of its weight and suitable fastenings, tightly seal off the interior of the trailer. On the other hand, when the panel is lowered to assume its service as a deck, the compartment 25 will be exposed to form a "cock-pit" or semi-enclosed deck area. To prevent movement of the panel 19 beyond its lowermost position, the frame 57 has formed therein a transversely disposed rib 70 in which a groove 71 is formed. The groove 71 engages a depending lip 72 of the flange 64 and produces a registry in level between the threshold afforded by the flange 64 and the deck floor panels 69.

The interior of the trailer may be separated from the compartment 25 by a wall 73 in which the doorway 74 is formed. If desired, the door 75 may be of the laterally sliding type and substituted by a screen door that slides in a similar manner into the construction of the wall 73.

Figure 13:
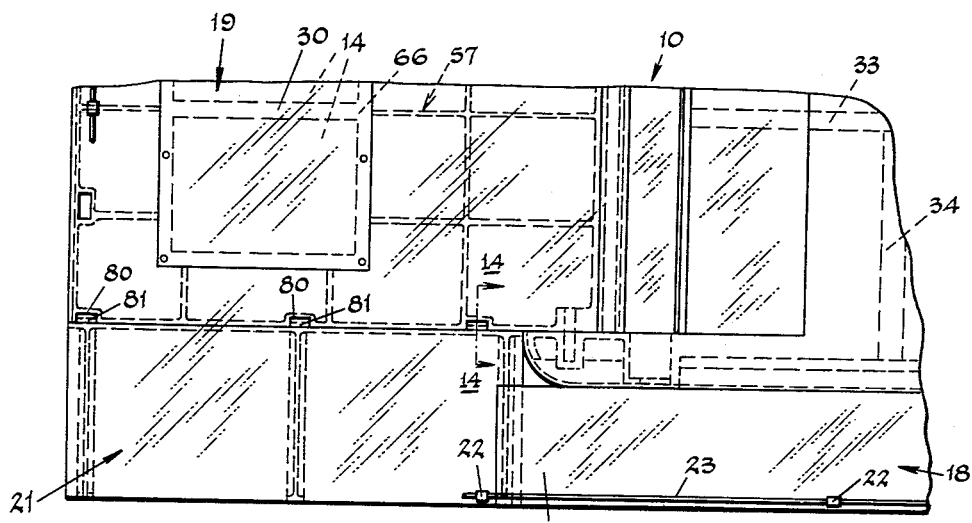
Fig. 13 is a plan view of a portion of the stern and after deck of the cruiser.
Figure 14:
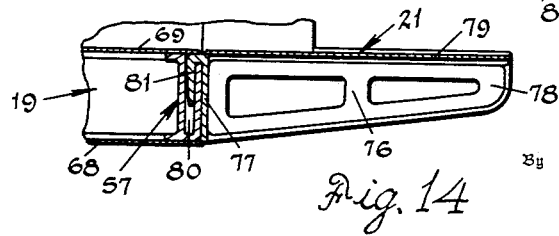
Fig. 14 is a fragmentary sectional view taken substantially along the line 14—14 in Fig. 13.

When the panels 17, 18 and 19 are disposed as shown in Figs. 6, 11 and 13, the width of the stern deck is completed by the addition of the auxiliary deck plates 20, 21 and 30. These deck plates as shown in Figs. 13 and 14 serve to "bridge" the space between the panels 18 on either side of the trailer and the panel 19. For this purpose, they have a length slightly less than the deck area afforded by the panel 19 and a width sufficient to extend the stern deck laterally to the edges of the panels 18. The plates 20 and 21 comprise a ribbed understructure 76 including the base rail 77 and outwardly disposed ribs 78. A suitable flooring 79 is secured thereon. For affixing said deck plates to the panel 19, the frame 57 thereof is provided with sockets 80 which are adapted to receive, in locking relation, downwardly directed tongues 81 integrally formed with the base rail 77. The frame 57 and the understructure 77 are also provided with sockets for receiving the lower ends of the respective posts 22 for a rope 32 which forms the deck rail.

In completing the overall surface of the deck, the panels 17 and 18 are provided with hinged plates 82 and 83 respectively that are adapted to be folded into the floors 47 when the panels are to be raised to their closed position. When employed as a portion of the deck, the plates 82 are disposed across the space between the ends of the panels 17 and 18 and the deck plates 20 and 21 while the plates 83 are located to serve as walking areas from the door or doors 15 from the interior of the trailer. To steady the plates 83, suitable braces 84 may be provided in the form of light steel cable which is secured at its end by rings or cleats to the body of the trailer and the plates 83.

As illustrated in Fig. 2, adequate deck space is thus made available when the panels 17, 18 and 19 are lowered from the positions in which they form walls of the trailer body. Further, when the auxiliary deck plates 20 and 21 are installed along the sides of the panel 19, the plates 81 will permit easy access from those portions of the deck formed by the panels 17 and 18. The posts 22 may now be placed in their sockets and the rope 23 threaded through their upper ends. Subsequently and when the trailer enters the water, these various associated deck members will be found to afford a very stable walking area.

While the bottom of the trailer may be adequately sheathed by metal plates 85 which are secured to the webs of the beams 33 and 34, it has been found preferable to increase the buoyancy of the trailer, when serving as a watercraft, by employing watertight bulkheads. These bulkheads, as indicated at 86 in Figs. 6 and 11, are suitably fashioned to fill the spaces between the bottom sheathing plates 85 and the floor 87 of the trailer, the longitudinal beams 33 and the transverse beams 34. By providing such buoyant chambers in that portion of the trailer which becomes literally the hull of the same when afloat, it is possible to maintain the trailer at the desired depth which in this particular construction may be of such a depth as to permit free navigation in shallow water areas.

In preparing the trailer for water trips, the panel 19 is lowered into a substantially horizontal position by swinging the same outwardly of the trailer body 10 on the axis of the shafts 58 in the bearings 59. Then the panel 19 assumes its position to provide the stern deck, the groove 71 in the rib 70 will be moved into engaging relation with the dependent lip 72 of the flange 64 to stop said panel in position.

The side panels 17 and 18 may now be removed from the wells 38 in the sides of the trailer by operating the members 50 to turn their threaded ends 54 out of the associated threaded sockets 55. When the panels 17 and 18 arrive at their horizontal positions, the tongues 45 will engage the flanges of the channels 35 to hold said panels in position. The auxiliary deck plates 20 and 21 are now added to the panel 19 and by inserting the tongues 81 of the panels' understructure 76 in the sockets 80 of the structure 57, a rigid relationship will be effected. Finally the plates 82 and 83 are located to complete the formation of the deck.

In order to insure the body of the vehicle being watertight for a distance upwardly from the bottom thereof that is equal to the displacement of the craft when in the water, and to further add to its nautical appearance, it is desired to partially close off, or to provide a raised sill for the door openings 15. To this end, as shown in Fig 8, the sill of the frame for the door or doors 15, and which includes the riser 49 of the channels 35, is provided with a groove 88 across the bottom and upwardly in the adjoining corners of the sill. This groove is intended to receive a water rail or panel 89, as is shown in Figs. 2 and 9; the panel raising the threshold level of the doorway in keeping with conventional ship construction. The panel 89 or the groove 88 may be equipped with a marginal strip of rubber, or like waterproofing composition, 90. This will render the sill watertight, and will also prevent water from washing into the interior of the trailer during normal navigation and particularly in inclement or rough weather.

The outboard motors 31 are then attached to the panel 19 and the craft is equipped for navigation. The trailer may be steered by means of the motors 31 in the usual manner of outboard motor handling. In more elaborate trailers, constructed in accordance with the invention, suitable steering lines may be incorporated so that the piloting can be done from an observation area behind the front windows 12.

In accordance with highway and marine regulations, suitable lamps having lens of proper indicating colors may be added to the side and/or front areas, of the trailer. Also to increase the nautical effect, such required life saving devices as the life rings 26 may be stored in the compartments 24 and 25, which are normally closed by the panels 17, 18 and 19, but are exposed to view when these panels are lowered to form decks.

As indicated above, in addition to their primary use as the decks of the converted watercraft, the panels 17, 18 and 19 may also be lowered to form porches for the house trailer after arrival at a seaside, or other vacation spot.

Also, while no specific description has been included relative to the wheels 11 and the mode of suspension, said wheels may be associated with the framing structure of the trailer in any conventional manner to readily permit their removal when the trailer is afloat. If desired the wheels, their springs and braking assemblies may be protected in any suitable manner to allow their remaining in operative position beneath the trailer at all times and without endangering or damaging their utility. In any event, it is preferred that the wheels be left on the trailer until it is actually afloat to facilitate its entry into the water.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. An amphibious vehicle normally adapted for use as a house trailer and comprising a wheeled body portion having top, bottom and side walls and an upwardly and inwardly slanting rear wall, a partition extending laterally of said vehicle inwardly of said rear wall to provide a compartment at the rear of the vehicle in the shape of a flying bridge, a door in said partition, means associated with the bottom side and rear walls of said vehicle to render the vehicle buoyant and watertight for a distance upwardly from the bottom thereof greater than the displacement of the vehicle when in the water, compartments built into the side walls of the vehicle, panels fitting into said side walls and normally closing said compartments, means mounting said panels in said compartments for movement outwardly therefrom to form decks, a panel fitting into said rear wall and normally closing the compartment at the rear of the vehicle, and means mounting said last named panel for movement outwardly from said rear wall to disclose the flying bridge and into position to provide an after deck when the vehicle is in the water.

2. An amphibious vehicle normally adapted for use as a house trailer and comprising a wheeled body portion having top, bottom and side walls and an upwardly and inwardly slanting rear wall, a partition extending laterally of said vehicle inwardly of said rear wall to provide a compartment at the rear of the vehicle in the shape of a flying bridge, a door in said partition, means associated with the bottom side and rear walls of said vehicle to render the vehicle buoyant and watertight for a distance upwardly from the bottom thereof greater than the displacement of the vehicle when in the water, compartments built into the side walls of the vehicle, panels fitting into said side walls and normally closing said compartments, means mounting said panels in said compartments for movement downwardly and outwardly therefrom into position at a distance above said bottom greater than said first mentioned distance to form decks, a panel fitting into said rear wall and normally closing the compartment at the rear of the vehicle, means mounting said last named panel for movement downwardly and outwardly from said rear wall to disclose the flying bridge and into position to provide an after deck, and auxiliary deck plates filling the spaces between said main decks and said after deck when the vehicle is in the water.

References Cited in the file of this patent

UNITED STATES PATENTS

| 1,038,176 | Millican | Sept. 10, 1912 |
| 2,141,181 | Geddes | Dec. 27, 1938 |
| 2,233,240 | Boldis et al. | Feb. 25, 1941 |
| 2,266,769 | Kramer | Dec. 23, 1941 |
| 2,278,255 | Grabbe | Mar. 31, 1942 |
| 2,583,929 | Clark | Jan. 29, 1952 |

FOREIGN PATENTS

| 766,934 | France | July 6, 1934 |
| 902,131 | France | Nov. 27, 1944 |